United States Patent [19]
Sheldon et al.

[11] Patent Number: 5,543,893
[45] Date of Patent: Aug. 6, 1996

[54] COPIER APPARATUS AND METHOD WITH IMPROVED JAM RECOVERY

[75] Inventors: Eric G. Sheldon, Holley; Ronald W. Stephens, Lima; George R. Vorhauer, Rochester, all of N.Y.

[73] Assignee: Eastman Kodak Company, Rochester, N.Y.

[21] Appl. No.: 343,405

[22] Filed: Nov. 22, 1994

[51] Int. Cl.⁶ .................................................. G03G 21/00
[52] U.S. Cl. .......................................... 355/206; 358/498
[58] Field of Search ................................... 355/204, 205, 355/206, 207, 313, 318, 209, 233; 358/496, 498

[56] References Cited

U.S. PATENT DOCUMENTS

| | | | |
|---|---|---|---|
| 4,076,408 | 2/1978 | Reid et al. | 355/309 |
| 4,248,528 | 2/1981 | Sahay | 355/308 |
| 4,421,404 | 12/1983 | Conly | 355/206 |
| 4,433,909 | 2/1984 | Goes In Center et al. | 355/206 X |
| 4,723,148 | 2/1988 | Hamakawa | 355/206 X |
| 4,822,021 | 4/1989 | Giannetti et al. | 271/35 |
| 4,884,097 | 11/1989 | Giannetti et al. | 355/23 |
| 4,949,190 | 8/1990 | Thompson | 358/426 |
| 5,077,579 | 12/1991 | Shibusawa et al. | 355/309 |
| 5,109,252 | 4/1992 | Schott, Jr. | 355/202 |
| 5,126,790 | 6/1992 | Moore et al. | 355/207 |
| 5,144,384 | 9/1992 | Fujita et al. | 355/207 X |
| 5,299,021 | 3/1994 | Gartner | 358/401 |

*Primary Examiner*—Robert Beatty
*Attorney, Agent, or Firm*—Norman Rushefsky

[57] ABSTRACT

A copier apparatus and method for copying is described that includes a scanning station for scanning a set of document sheets to be copied as a production job. The scanning station includes a platen for supporting a document sheet to be scanned in a first mode wherein the document sheet is manually positioned on the platen by an operator. An automatic document handler or feeder is provided for automatically feeding seriatim document sheets to the scanning station for scanning document sheets in a second mode; i.e., an automatic feeding mode. An operator control panel includes a display for indicating options for selection by an operator in response to clearance of a jam condition in the feeder. The display includes an option for selecting the first mode; i.e. platen mode, for scanning of the document sheet that was jammed. There is thus provided a facile recovery from a jammed condition allowing copying from the platen of documents that may no longer be suited for feeding through the feeder as part of a pause or interrupt operation in a production job.

18 Claims, 6 Drawing Sheets

LAST <#> ORIGINALS NOT SCANNED.
TO SCAN THESE ORIGINALS FROM THE
GLASS, SELECT <CHANGE TO PLATEN MODE>.
OTHERWISE, RETURN THESE ORIGINALS TO
INPUT HOPPER AND PRESS <START>.

CHANGE TO PLATEN MODE

FIG. 6

COPYING USING GLASS SELECTED. IF THERE ARE
NO MORE ORIGINALS IN THE JOB SELECT
<ALL ORIGINALS SCANNED>, TO CONTINUE WITH
NEXT ORIGINAL FROM FEEDER, SELECT
<CHANGE TO FEEDER MODE>.

CHANGE TO FEEDER MODE

ALL ORIGINALS SCANNED

FIG. 7

COPIER APPARATUS AND METHOD WITH IMPROVED JAM RECOVERY

BACKGROUND OF THE INVENTION

1. Field of the Invention

The present invention relates generally to copier apparatus such as electrostatographic copiers and methods for using same, and more particularly, to copier apparatus and methods for making collated sets of reproductions.

2. Brief Description of the Prior Art

As noted in U.S. Pat. No. 4,076,408, it is well known in the prior art to provide convenience copiers with document feeders that present the individual document sheets to the copier, one-after another or seriatim, in a manner suitable for producing collated copies without a sorter.

In such apparatus, the original comprising a set of individual sheets, is automatically circulated for presentation to an optical exposure station, one sheet after another for copying.

More recently, an improvement in copying is provided by using electronic collated copiers such as described in U.S. Pat. No. 4,949,190. In such electronic copiers, image data is "read" by scanning an original with an electronic scanner so that optical image information on the original is converted to a stream of electronic video or image data. The video data may be stored in multi-page buffer memories. When a plurality of copy sets of a multi-page document are to be produced as a copy job, the stored video data for each page are repeatedly sent to the printer in proper page order such that the reproduction sets are automatically collated without use of a sorter.

A problem with apparatus of the above type is that a jam may occur in the feeding of one of the originals in a multisheet set of documents. In known copiers sensors are provided for detecting a jam and when detected the feeding of further sheets is stopped until the jam is cleared. Typically, upon detection of removal of the jam, the operator is advised by a display to place unscanned originals in the feeder in the original order and to press a start or copy commencement button to continue copying of the job. A further message may also be provided to press a stop/reset button to cancel the job and reset features that have been programmed into the copier for producing the now canceled job. The above problem is further compounded by the problem that the original that became jammed may be wrinkled either by the feeding apparatus or as a result of removal of the document sheet by the operator from its jammed position in the feeder. Placing this wrinkled document in its original position to secure scanning thereof could cause further attempts to feed this document to fail.

It is therefore an object of the invention to overcome the above problem and provide a copier with improved productivity in recovery from a jam condition.

SUMMARY OF THE INVENTION

The above and other subjects of the invention which will become apparent upon reading the specification are realized by a copier apparatus for producing copies of an original multisheet document set, the apparatus comprising: a scanning station for scanning a set of document sheets to be copied as a production job, the scanning station including a platen for supporting a document sheet to be scanned in a first mode wherein the document sheet is manually positioned on the platen by an operator; feeder means for automatically feeding seriatim document sheets to the scanning station for scanning document sheets in a second mode; recording means for copying images of said document sheets; means for generating a signal in response to a jam condition of a document sheet in said feeder means; an operator control panel including display means for indicating options for selection by an operator in response to clearance of the jam condition, and control means responsive to said signal for interrupting feeding of document sheets by said feeding means and for enabling on said display means in response to clearance of the jam a display representing an option to select said first mode for scanning of the document sheet that was jammed.

In accordance with another aspect of the invention, there is provided a method for copying documents comprising: automatically feeding seriatim document sheets from a set of document sheets to be copied as a production job to a scanning station for scanning of document sheets; scanning document sheets for copying of images on said document sheets; generating a signal in response to a jam condition of a document sheet in said feeder means; indicating options on a display for selection by an operator in response to clearance of the jam condition; and interrupting in response to said signal, feeding of document sheets by said feeding means and displaying, in response to clearance of the jam, a display representing an option for selecting manual placement at the scanning station of the document sheet that was jammed.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

The preferred embodiments are described herein with reference to an electrophotographic copier, but it will be understood that the invention can be used in any form of black and white or color copier having an automatic means for feeding document originals. The description will be directed in particular to elements forming part of, or cooperating more directly with, apparatus in accordance with the present invention. It is to be understood that elements not specifically shown or described may take various forms well known to those skilled in the art.

Figure 1:
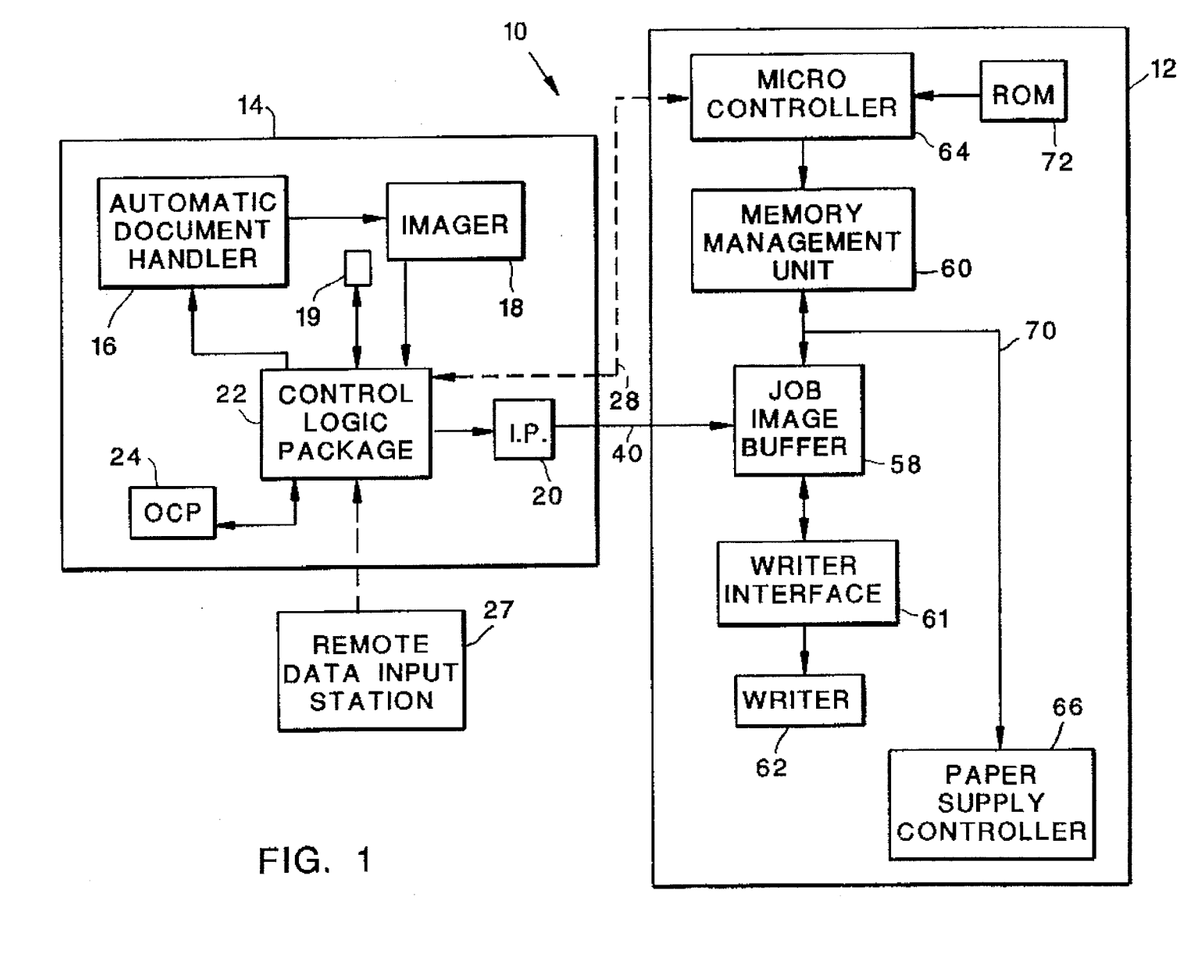
FIG. 1 is a block diagram of a copier apparatus according to a preferred embodiment of the present invention.

According to FIG. 1 and with regard to U.S. Pat. No. 5,109,252, a copier 10 includes a marking engine 12 and a document scanner assembly 14. Scanner assembly 14 comprises an automatic document feeder (ADF) or handler 16 such as, for example, a recirculating document feeder or other feeder that includes a hopper for storing a multisheet document original and feed rollers or belts for stream feeding document sheets seriatim past a scanner system and back to the hopper or to a second hopper. Focused light reflected from an original document sheet image is swept past an imager or scanner device 18 such as a linear array of photo transducers (photo diodes or charge coupled devices) for converting an image of the optical information on each original document sheet into electrical signals having values representative of the image density at associated pixel areas on the respective original document sheet.

As the scanning of the original document sheet proceeds in a direction perpendicular to the imager 18 and row of pixel areas, a series of output signals from the transducers are repetitively loaded into an associated shift register (not shown) and shifted out serially to provide a series of electrical signals having values representative of the image density of respective pixel areas in corresponding rows of pixel areas across the document image.

Scanner assembly 14 also includes a control logic package 22 having an integral data input station comprising an operator control panel 24 including buttons or input areas for the operator to input functions and to receive messages from the copier. Alternatively, setup instructions may be received via removable memory media or through signals provided from a remote data input station 27. An example of an electronic scanner is described in U.S. Pat. Nos. 4,822,021 and 4,884,097, the contents of which are incorporated herein by this reference.

Figure 2:
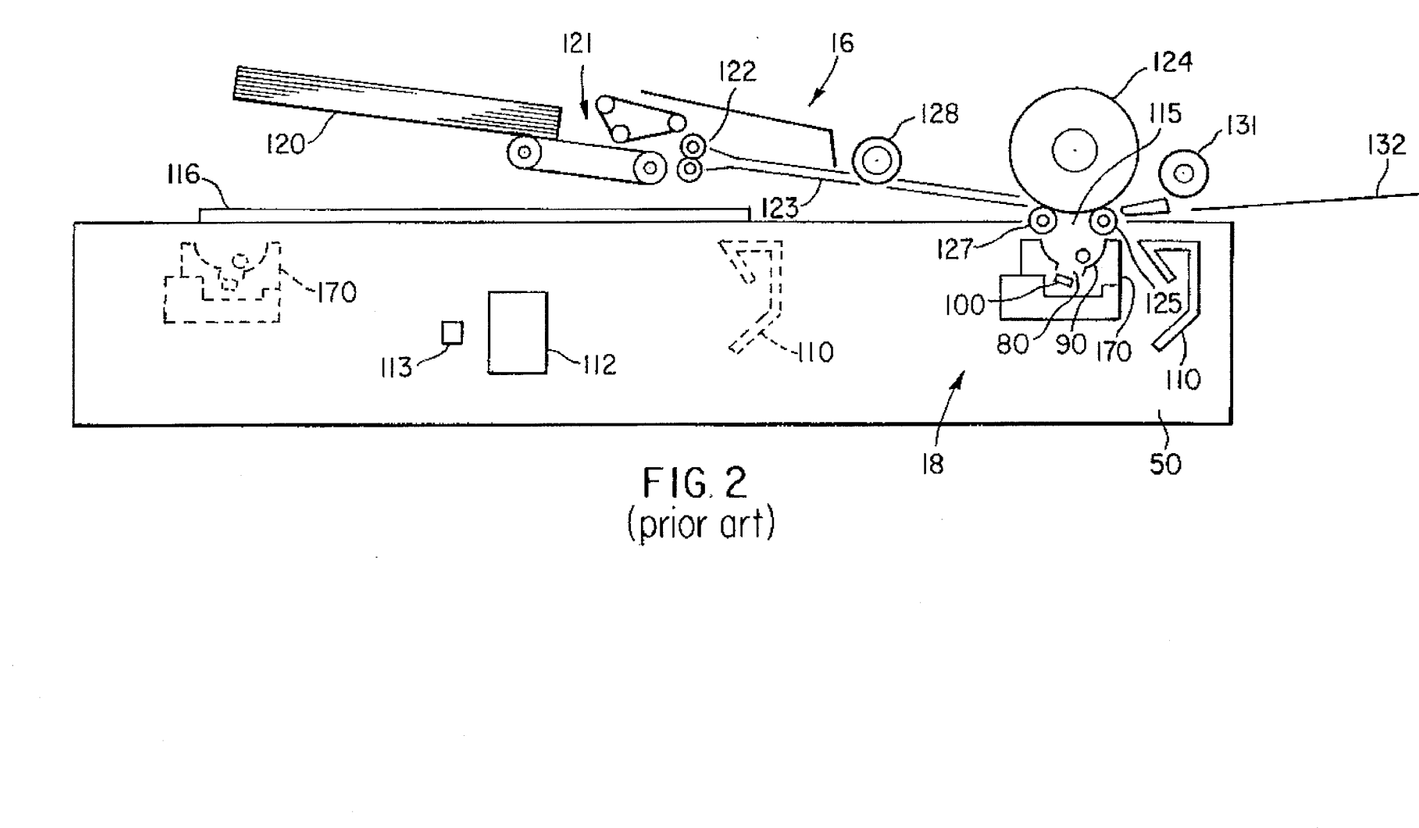
FIG. 2 is a schematic of an automatic document feeder and exposure station as known in the prior art.

Referring to FIG. 2, an electronic scanner and automatic document handler or feeder as known in prior art, and which may be included in the apparatus of the invention, includes an illumination head 170 containing an exposure radiation source 80, an elliptical reflector 90 and a plane reflector 100. The illumination head 170 cooperates with a pair of movable mirrors 110, an objective 112 and an electrooptical image sensor having separately addressable pixels, for example, a CCD 113. Objective 112 and CCD 113 are stationary while the illumination head and pair of movable mirrors are movable from the position shown in solid lines to the position shown in phantom in FIG. 2.

When the illumination head 170 is located in the position shown in solid lines in FIG. 2., it is positioned to project onto CCD 113 an image of a moving document presented by the document handler to an exposure position 115. The illumination head 170 and mirrors 110 are movable by a pulley system, not shown, to scan an image of a document or other object manually placed on an exposure platen or glass 116 onto CCD 113. The document may be manually positioned by pivoting or raising the portion of the feeder that includes the input tray which thereby provides access for placement of the document on the platen.

The document handler 16 includes a document supply or input tray 120 into which a multisheet (or single sheet) document is placed face down. In response to pressing of a start button, S, by the operator, document sheets are fed one at a time from the bottom of the stack by a scuff separating device 121. The input tray 120, is inclined from the horizontal to gain the assistance of gravity in the separating process. Documents separated from the stack are fed by a pair of feed rollers 122 along an input path 123, defined by registration guides and having a registration roller 128 to a turnover drum 124. Turnover drum 124 is driven by drum drive rollers 125 and 127 which in turn are driven by suitable means, not shown. The document is fed across the exposure position 115 by the combined action of the drum drive rollers 125 and 127 driving both the document and the turnover drum 124. The turnover drum 124 is held tight against the drum drive rollers 125 and 127 to assure location of the document in the object plane of the objective 112.

If only one side of the document is to be scanned, a separator or diverter, not shown, is moved to a raised position which strips the document from turnover drum 124 and allows it to be fed by a simplex exit roller 131 into a simplex exit tray 132. Because the documents are placed face down in the document input tray 120 and are fed in that position across the exposure position 15 and into the simplex exit tray, and new documents are fed into the simplex exit tray on top of preceding documents, the stack of documents in the simplex exit tray ends up in the same order and orientation as in the document input tray 120.

The logic package consists of control software, interface software and logic hardware, including one or more microprocessors. Setup instructions are input to the scanner, while synchronization signals to identify separate scan lines and to provide page information and marking engine control, as well as information for finishing and processing of jobs, will be sent to marking engine 12 via a job control communications link 28. The marking engine may comprise an ink jet, thermal, photographic or electrostatographic marking engine wherein a source of electrical signals modifies a writer to print images in accordance with electronic signals. Electrophotographic marking engines such as electrophotographic marking engines using LEDs or laser writers are preferred which modulate light with image data to record on a photoconductive recording medium. Modulated electrostatic images on the medium are developed with electroscopic toners and transferred to a record copy such as plain paper or plastic sheets; see for example U.S. Pat. No. 4,949,190, the pertinent contents of which are incorporated herein by reference. In a preferred embodiment, a grey level printhead is used such as an LED printhead wherein a multibit data signal representing density of each pixel to be recorded is output to the printhead to record pixels of varying grey levels in accordance with a multibit image data signal. An example of a grey level LED printhead is described in U.S. Pat. No. 5,126,759, the pertinent contents of which are incorporated herein by reference.

Alternatively, the marking engine may include an electrostatographic reproduction apparatus wherein optical exposures of the image on each document is made as the document sheets are fed seriatim to an exposure station. The exposure station would either incrementally scan an image of the document sheet onto a photoconductive member or the "scanning" of a document sheet may be through a full frame exposure. Collation of multiple copies may be made by a sorter with plural exposures of an original document sheet made when it is advanced to or placed upon the exposure platen.

Figure 3:
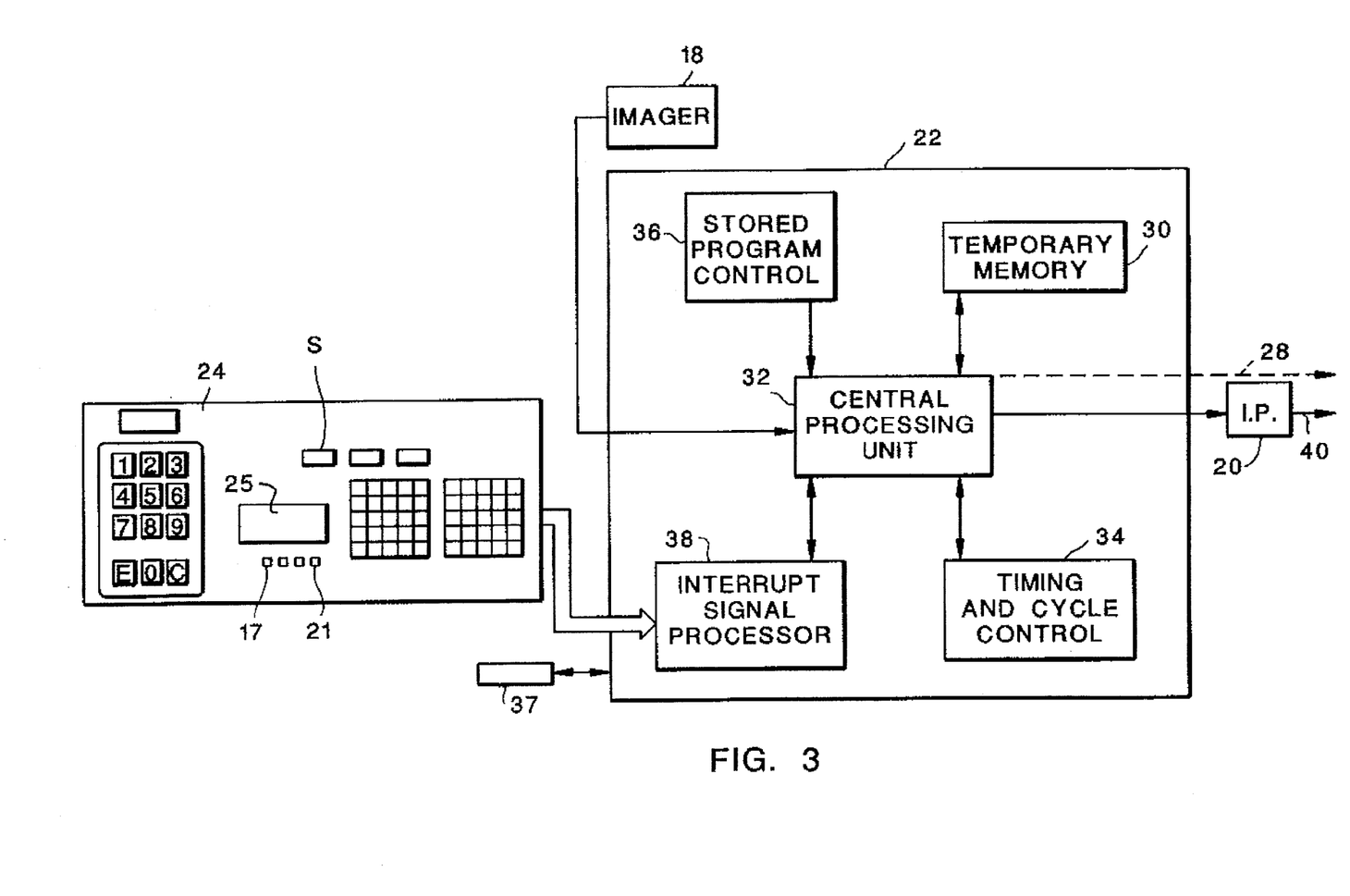
FIG. 3 is a schematic view illustrating in more detail portions of the copier apparatus of FIG. 1.

FIG. 3 includes a more detailed block diagram of control logic package 22 and operator control panel (OCP) 24 with soft-key-provided LCD display screen 25. Display screen 25 provides text, graphics and softkey selections. Messages and graphics are used to guide the operator through the various modes of operation explained below.

The control logic package comprises temporary data storage memory 30, central processing unit 32, timing and cycle control unit 34, and stored program control 36. Data input and output is performed sequentially under program control. Input data are received from imager 18 in the form of an 8-bits per pixel video stream of data. Setup and control signals are received either from operator control panel 24 or a removable memory media 37 through an interrupt signal processor 38. The output data is applied through processing electronics 20 and an image data bus 40, and control signals are applied via control communications link 28, to marking engine 12.

Referring again to FIG. 1 marking engine 12 receives bit stream image data over bus 40 and job control data over a communications link 28, both for storage in a multiple page buffer memory 58. The page buffer will accept electronic image data from scanner 14 and store that data until needed by a writer 62. The storage media is preferably a dynamic random access memory under the control of a memory management unit 60.

Control means, including a microcontroller 64 is arranged to perform arithmetic and logic operations and instruction decoding as well as controlling the time allocation of peripherals (such as a paper supply controller 66 and accessories communications for finishers, staplers, exit hoppers, etc.) through a machine control communications link 70. Several output functions may be available for receiver sheets including selection for output trays, stapling, sorting, folding, finishing, mailbox, envelope receiver, etc.

Microcontroller 64 has associated with it RAM for storing image location addressed, and a read-only memory 72 in which is stored various fixed forms such as test patterns, density patch patterns for process control purposes, billing forms, etc.

Figure 4:
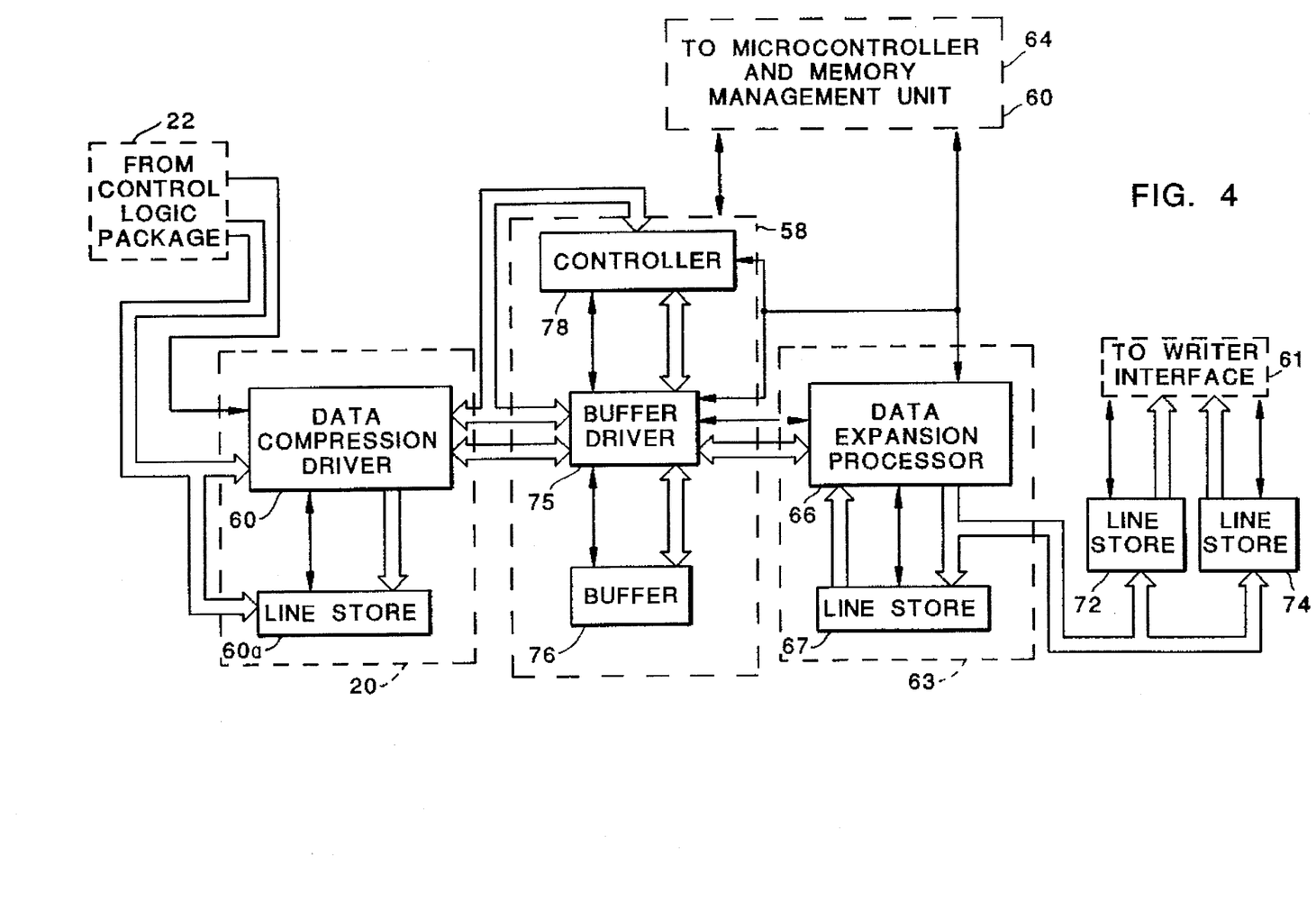
FIG. 4 is a schematic illustrating in more detail a job image buffer illustrated in FIG. 1.

With reference to FIG. 4, the image processor 20 may include a data compressor which receives the image data stream from imager 18. Data compressor is preferably a hardware implementation of an appropriate algorithm which encodes redundant information into a more compact form before passing the compressed data stream to a multi-page buffer memory 58. The data compressor includes a data stream compression driver 60 and a line store 60a for buffering a full line's worth of data.

A data expander 63 is the companion to the data compressor, and it includes a data expansion processor 66 and a line store 67. The expander retrieves the compressed data stream from multi-page buffer memory 58 and reconstructs the output data into original form for a writer interface 61. The writer interface receives a full line of image data from the data expander as the line is processed, and has a pair of line stores 72 and 74 and random logic to resequence the data stream before sending it to printhead or writer 62.

Multi-page buffer memory 58 also known as a job image buffer or JIB is provided for storing image data of all the pages in each production job to permit the electronic recirculation of images for collation; thereby eliminating the need for a mechanical recirculating document handler. The heart of the multi-page buffer memory is a large bank of dynamic random access memory (DRAM) in a buffer 76 for storage of the image data as it is processed by data compressor 20. The buffer memory is large enough to store the data for several production jobs simultaneously wherein each job is of multiple pages.

Controller 78 and buffer driver 75 act as a direct memory access controller, allowing data compressor 20 and expander 64 direct access to DRAM buffer 76 without a microprocessor, and as a DRAM controller arbitrating between memory read, write and refresh cycles.

The microcontroller 64 functions as the system manager, overseeing the overall operation of the multi-page buffer memory, the microcontroller will handle communication with a logic and control unit (LCU) (not shown) of the marking engine, store the internal pointers identifying the beginning and ending addressed for each image, initiate transfers from the scanner assembly 14 and control the data compression and expansion process. The microcontroller and LCU comprise electronic collation means for presenting the stored image data for printing in the proper sequence, as often as it needed to produce the desired number of collated document sets whereby a plurality of electronically collated, multipage sets can be printed as known in the prior art.

Assuming an operator has placed an original multisheet document set to be copied into a document feed hopper and set up the parameters for a copy job, e.g., number of copies for reproducing the document set and other conventional parameters, the control logic package 22 is programmed to operate as set forth below. In response to pressing of the "start" button, S, on the OCP 24, a decision is made as to whether or not documents are in the automatic document feeder (ADF). As noted above, the ADF may be a recirculating document feeder (RDF) wherein documents that are stored in a hopper are circulated to an exposure platen in serial fashion and returned to the hopper. At the exposure platen or glass which is part of imager 18, the document sheets are scanned or read during the sheet feeding operation to generate electronic signals representing the density of image information on the sheets. The ADF may also be a feeder where the documents are presented seriatim and automatically to the platen and are then fed to a stack or hopper at a different location from which originally presented. In any event, if documents are sensed by suitable known sensors to indicate that this is an ADF job, scanning of the originals in serial fashion for image information is made by the scanner. The scanner may also include scanning for automatic document recognition (ADR), see U.S. Pat. No. 4,922,350, which describes a prescan for ADR determination. As the document sheets are fed seriatim to or from the scanner, a count is made by well known means of the number of document sheets fed during this sheet feeding operation. There is also displayed on display screen 25 an indication that processing for printing of the requested number of copy sets has begun. This processing can include subjecting the incoming data to edge enhancement and/or compression, the latter to make efficient use of memory space in buffer 76. As is well known, the feeder may comprise a housing that includes a hopper for storing document sheet originals above the platen. The housing can also include the feeder devices and sensors. The housing may be lifted to allow an operator access to the glass to position a document sheet say face down on the glass for scanning by the electronic scanner device located beneath the glass. Of course, other types of scanning stations are contemplated including a separate scanner for feeder mode and one for glass mode scanning.

Figure 5:
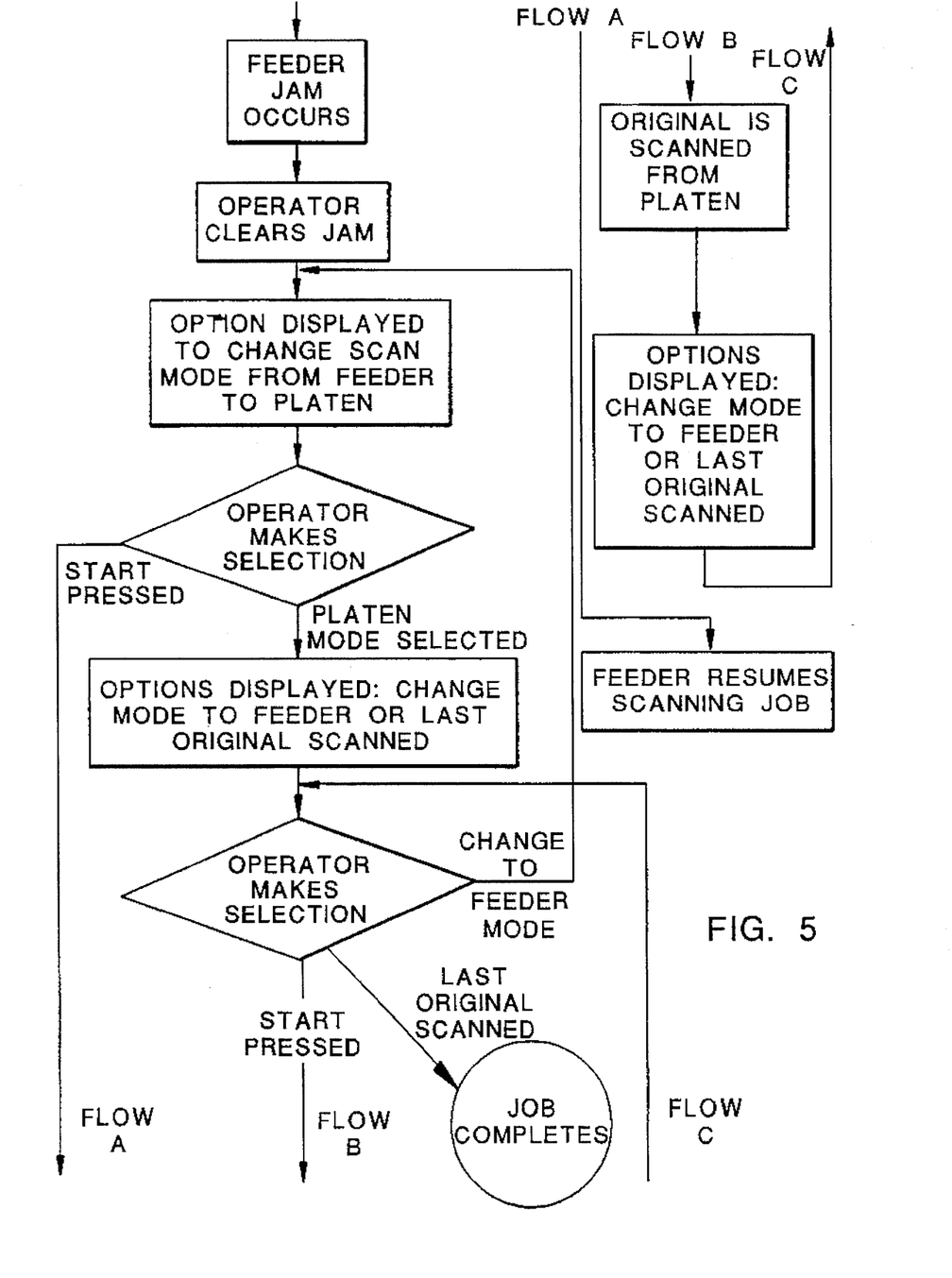
FIG. 5 illustrates a flowchart for operation of the copier apparatus of FIG. 1 in accordance with a preferred embodiment of the method and apparatus of the invention.

With reference now to the flowchart of FIG. 5, assume that during a production job involving a multisheet document that is fed by an ADF that a jam is detected by one or more sensors 19 for detecting one or more sheets in the paper path. In response to the detection of the jam a signal is provided to the control logic package (CLP) 22 which thereupon directs through a control channel a signal causing the ADF 16 to cease feeding additional sheets to the imager 18. Alternatively, the sensor 19 may provide this signal directly to the ADF 16. When a jam occurs, the control logic package (CLP) 22 determines whether a sheet has entered the feeder by leaving input tray 120 and passing through scuff separating device 121 (see FIG. 2). Any sheet having entered the feeder, but which has not been completely scanned before the jam occurs must be scanned or rescanned using either scanning from the platen or via the feeder. Before an original is rescanned, the first partial scanned image for that original must be removed from the JIB 58. This is accomplished through a control message to microcontroller 64 using link 28, which then causes the microcontroller to erase a partially scanned-in image from the JIB or an image where there is some uncertainty that it has been fully scanned.

Figure 6:
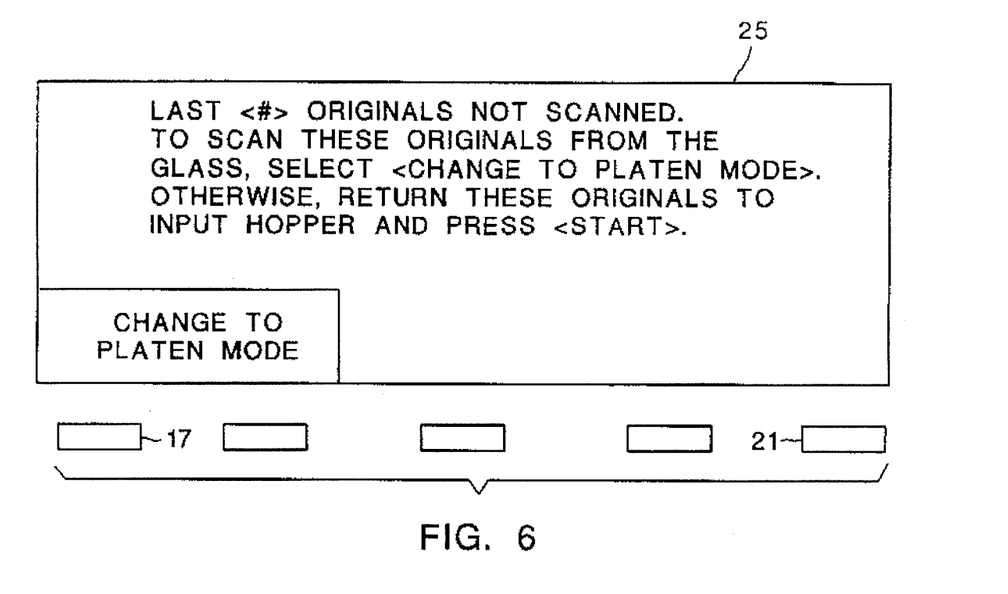
FIG. 6 illustrates a screen display that may be used in accordance with the invention to recover from a jam cleared condition.

The CLP 22 also retains the job parameters for this copying operation as established at the beginning of programming the job such as number of copies, paper size, simplex or duplex, etc. There is also stored a count of the total number of originals already scanned in the job and in response to signals from various sensors located along the ADFs document sheet feed path, the number of originals moved into the feeder and which have not been completely scanned. This number may be indicated as shown in FIG. 6. The CLP 22 also provides an instructional message to the operator via the display screen 25 that a jam in the document feeder is to be cleared and may provide diagrammatic or other instructions as to where the jam is to assist the removal of the jammed document sheet.

In response to removal of the jammed document sheet(s) as detected by the sensors which transmit signals to the CLP, the CLP 22 causes a message to be displayed on the display screen 25 such as that shown in FIG. 6. The process of jam recovery as provided herein bears some similarities to a "pause" or interrupt mode that is programmed in a job stream programming mode and used on the KODAK 1570 and 1575 Copier/Duplicators manufactured by Eastman Kodak Company, Rochester, N.Y. and which may also be used on the copier of the invention. In such a "pause" mode, a key sheet is placed in the stack of original documents to be copied in front of a particular document sheet where a special feature is to be programmed. During initial setup of the copier for this special feature, a pause option is selected. Upon feeding of the document sheets in a job stream programming mode, when the key sheet is detected by a sensor in the ADF 16 the feeder stops feeding sheets thereby creating a pause and a screen display indicating various copying options is generated including an option for selecting copying from the glass.

As noted in FIG. 6, the screen display for recovery from a jam in accordance with the invention provides an option for selecting the feeder or the glass. For convenience, one mode will be presumed to be the default mode, thus a selection is required to change from the default mode. The program may provide the default option as indicated to be in favor of the feeder. Soft key 17 on the OCP is enabled to allow operator selection of the glass platen by pressing key 17 for scanning in of the jammed document sheet or sheets in the event that the removed jammed document is not suited for feeding from the feeder or the operator does not wish to place the jammed sheet(s) in the ADF. Upon return of the jammed original to the document sheet stack in its correct order and selection of the feeder (by default) the start button is pressed by the operator and the feeder resumes scanning the remainder of the job. With pressing of the start button the remainder of the job is completed using the feeder with copies made by serially feeding the remainder of the documents in the feeder to the scanner. After the job is scanned once, copying of collated sets of plural copies can be made by printing repeatedly the image data stored in the job image buffer without need to scan the originals again.

Figure 7:
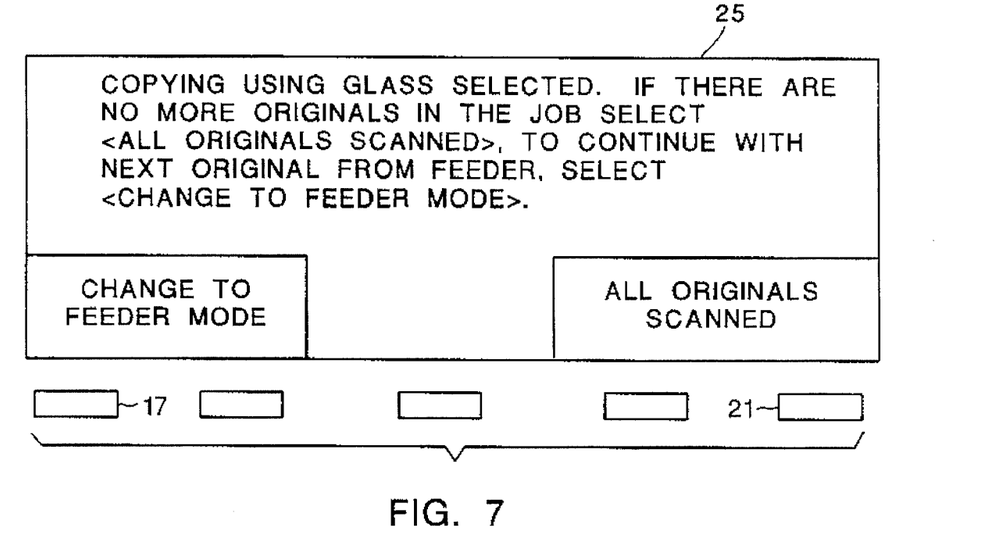
FIG. 7 illustrates a screen display wherein in recovering from a jam cleared condition scanning is selected by copying the document while it is on the glass or platen.

In the event the operator selects the platen or glass mode for copying by pressing key 17 while the display screen of FIG. 6 is present, the CLP 22 causes the display of FIG. 7 to be generated directing the operator to indicate using soft key 21 if the document sheet to be placed on the platen or glass for scanning is the last document sheet in the current job. If the document sheet is the last document sheet of the job and is so indicated using soft key 21 the scanning of this document sheet is made after it is placed on the glass by the operator by lifting of the housing supporting the document input tray 120 and then returning this tray to a position for covering the platen and after the operator presses the start button. Copying commences by making copies from the data stored in the JIB as described above. Alternatively, some copying can commence after the first sheet of the document is stored in the JIB. As noted in FIG. 7, an option is provided for change to the feeder mode using soft key 17 which is described above.

If the jammed document sheet is not the last of the set of document sheets in the job in progress the operator may place the document sheet to be scanned next on the glass and presses the start button; see Flow B in FIG. 5. This document sheet is scanned while on the glass and a display on the display screen is generated indicating the scanning is being made from the glass. After it is scanned the CLP 22 causes the display screen of FIG. 7 to again be generated. The reason for this is that plural document sheets may have been jammed in the feeder and been damaged and are not suited any longer for feeding through the feeder. Alternatively, the operator may feel that the next succeeding documents are not suited for feeding through the feeder and thus the copier provides an option for easy entry into the copying from the glass mode for succeeding document sheets remaining to be scanned. As may be seen in FIG. 5 subsequent document sheets may be individually scanned off the glass, see flow C, until either the feeder is selected for scanning the remainder of the document sheets in the job or the job is complete. The selection of the feeder is available for each next sheet in the job as the screen display in FIG. 7 is provided as a prompt until the operation of the feeder is selected for the remaining sheets in the job.

The invention thereby provides an improved handling of the recovery from a jam by effectively causing an equivalent of a job stream programmed pause or interrupt mode to be generated in response to the jam. There is thereby provided various options to the operator for recovery from a jam in a facile manner.

The invention has been described in detail with particular reference to preferred embodiments thereof and illustrative examples, but it will be understood that variations and modifications can be effected within the spirit and scope of the invention.

We claim:

1. A copier apparatus comprising:

means including a scanning station for scanning a set of document sheets to be copied as a production job, the scanning station including a platen for supporting a document sheet to be scanned in a first mode wherein the document sheet is manually positioned on the platen by an operator and the scanning station including means for scanning document sheets In a second mode wherein the document sheets are automatically fed;

feeder means for automatically feeding serlatim document sheets to the scanning station for scanning document sheets in the second mode;

recording means for copying images of said document sheets;

means for generating a signal in response to a jam condition of a document sheet in said feeder means;

an operator control panel including display means for indicating options for selection by an operator in response to clearance of the jam condition;

control means, responsive to said signal, for interrupting feeding of document sheets by said feeder means and for enabling on said display means in response to clearance of the jam a display representing an option for selecting said first mode for scanning of the document sheet that was jammed;

means for actuating said scanning station for scanning said jammed document sheet in said first mode; and means for actuating said recording means for producing a copy of said document set as a production job.

2. The apparatus of claim 1 and wherein said display means provides a display indicating an additional option allowing selection of said second mode.

3. The apparatus of claim 2 and wherein said display means provides a prompt and a means for input by an operator that the jammed document sheet is the last original of the set of document sheets.

4. The apparatus of claim 1 and wherein said display means provides a display indicating that the jammed document sheet is the last original of the set of document sheets.

5. The apparatus of claim 2 and including means, responsive to selection of scanning in a first mode of a next original document sheet after a jam clearance condition, for generating a display representing an option for selecting said first mode for scanning a document sheet that is subsequent to said next original document sheet in said set.

6. The apparatus of claim 1 and including means, responsive to selection of scanning in a first mode of a next original document sheet after a jam clearance condition, for generating a display representing an option for selecting said first mode for scanning a document sheet that is subsequent to said next original document sheet in said set.

7. A method for copying documents comprising:

automatically feeding seriatim document sheets from a set of document sheets to be copied as a production job to a scanning of the document sheets;

scanning document sheets for copying of images on said document sheets;

generating a signal in response to a jam condition of a document sheet being led;

interrupting, in response to said signal, feeding of document sheets;

displaying, in response to clearance of the jam condition, a display representing an option for selecting a mode for manual placement at a scanning station of the document sheet that was jammed;

scanning the document sheet that was jammed after it is manually placed at the scanning station; and producing a copy of the set of document sheets as a production job.

8. The method of claim 7 and wherein there is provided a display representing an additional option allowing selection of automatic feeding of the document sheet removed from a jam condition.

9. The method of claim 8 and wherein there is provided a display representing a prompt allowing for input by an operator that the jammed document sheet is the last original of the set of document sheets.

10. The method of claim 7 and wherein there is provided a display representing a prompt allowing for input by an operator that the jammed document sheet is the last original of the set of document sheets.

11. The method of claim 8 and including, in response to selection of scanning in a manual placement mode a next original document sheet after a jam clearance condition, generating a display representing an option for selecting said manual placement mode for scanning a document sheet that is subsequent to said next original document sheet in said set.

12. The of claim 7 and including in response to selection of scanning in it manual placement mode a next original document sheet after a jam clearance condition, generating a display representing an option for selecting said manual placement mode for scanning a document sheet that is subsequent to said next original document sheet in said set.

13. A copier apparatus comprising:

scanning means for scanning a set of document sheets to be copied as a production job, the scanning means including an electronic scanner for scanning a document sheet and generating electronic data representing image information on the document sheet and a platen for supporting the document sheet to be scanned in a first mode wherein the document sheet is manually positioned on the platen by an operator, the scanning means also including means for scanning document sheets in a second mode wherein the document sheets are automatically fed;

feeder means for automatically feeding seriatim document sheets to the scanning means for scanning document sheets in the second mode;

recording means for copying images of said document sheets;

means for generating a signal in response to a jam condition of a document sheet in said feeder means;

an operator control panel including display means for indicating options for selection by an operator in response to clearance of the jam condition;

control means, responsive to said signal, for interrupting feeding of document sheets by said feeding means and for enabling on said display means in response to clearance of the jam a display representing an option for selecting said first mode for scanning of the document sheet that was jammed;

means for actuating said scanning means for scanning said jammed document sheet in said first mode; and means for actuating said recording means for producing a copy of said document set as a production job.

14. The apparatus of claim 13 and wherein said display means provides a display indicating an additional option allowing selection of said second mode.

15. The apparatus of claim 14 and wherein said display means provides a prompt and a means for input by an operator that the jammed document sheet is the last original of the set of document sheets.

16. The apparatus of claim 13 and wherein said display means provides a display indicating that the jammed document sheet is the last original of the set of document sheets.

17. The apparatus of claim 14 and including means, responsive to selection of scanning in a first mode of a next original document sheet after a jam clearance condition, for generating a display representing an option for selecting said first mode for scanning a document sheet that is subsequent to said next original document sheet in said set.

18. The apparatus of claim 13 and including means, responsive to selection of scanning in a first mode of a next original document sheet after a jam clearance condition, for generating a display representing an option for selecting said first mode for scanning a document sheet that is subsequent to said next original document sheet in said set.

* * * * *